(12) United States Patent
Wetter et al.

(10) Patent No.: US 11,446,594 B2
(45) Date of Patent: Sep. 20, 2022

(54) DEVICE FOR SEPARATING SOLID PARTICLES FROM LIQUIDS AND GASES

(71) Applicant: DrM, Dr. Müller AG, Männedorf (CH)

(72) Inventors: Kevin Wetter, Teufen (CH); Patrick Müller, Meilen (CH)

(73) Assignee: DRM, DR. MÜLLER AG, Männedorf (CH)

( * ) Notice: Subject to any disclaimer, the term of this patent is extended or adjusted under 35 U.S.C. 154(b) by 79 days.

(21) Appl. No.: 16/481,517

(22) PCT Filed: Jan. 29, 2018

(86) PCT No.: PCT/IB2018/050518
§ 371 (c)(1),
(2) Date: Jul. 29, 2019

(87) PCT Pub. No.: WO2018/138693
PCT Pub. Date: Aug. 2, 2018

(65) Prior Publication Data
US 2019/0374882 A1    Dec. 12, 2019

(30) Foreign Application Priority Data

Jan. 30, 2017  (CH) .......................................... 99/17

(51) Int. Cl.
*B01D 29/52*    (2006.01)
*B01D 29/19*    (2006.01)
(Continued)

(52) U.S. Cl.
CPC ............. *B01D 29/52* (2013.01); *B01D 29/19* (2013.01); *B01D 29/66* (2013.01); *B01D 35/30* (2013.01);
(Continued)

(58) Field of Classification Search
CPC ...... B01D 29/39; B01D 29/395; B01D 29/52; B01D 27/142; B01D 46/02; B01D 46/023;
(Continued)

(56) References Cited

U.S. PATENT DOCUMENTS

2010/0264100 A1    10/2010  Rivera et al.
2013/0186841 A1*   7/2013   Johnson ................. B01D 35/30
                                                              210/767

FOREIGN PATENT DOCUMENTS

CH          339 181 A      6/1959
DE       23 05 306 A1      8/1974
(Continued)

OTHER PUBLICATIONS

International Preliminary Report on Patentability dated Jul. 30, 2019.
(Continued)

*Primary Examiner* — Benjamin M Kurtz
(74) *Attorney, Agent, or Firm* — Lathrop GPM LLP; William T. Griffith

(57) ABSTRACT

In a device for separating solid particles from liquids and gases in flexible disposable plastic containers, a plurality of filter elements, consisting of flat, elongate support grids with filtrate drain channels and a covering, all-round closed filter medium, are connected to form a filter package and enclosed by a flexible plastic container. This disposable filter system is operated in a pressure vessel and can be compressed thereby applying an external pressure in such a way that the residual volume of the suspension is considerably reduced. As a result of the stable design, backwashing of the filter elements is possible, which prevents the build-up of a dense layer of solid particles and can therefore lead to increased filtrate flow. As a result of the completely sealed, sterile filter elements, the increased filter surface area and the resulting
(Continued)

high filter efficiency and complete filtration with reduced residual volume shares, this system proves to be a cost-effective filtration device with high flow rates, minimized cleaning costs and short changeover times when changing products.

10 Claims, 6 Drawing Sheets

(51) Int. Cl.
    *B01D 29/66*     (2006.01)
    *B01D 35/30*     (2006.01)
    *B01D 46/00*     (2022.01)
    *B01D 46/24*     (2006.01)
    *B01D 46/58*     (2022.01)
    *B01D 46/70*     (2022.01)

(52) U.S. Cl.
    CPC ..... *B01D 46/0002* (2013.01); *B01D 46/2403* (2013.01); *B01D 46/58* (2022.01); *B01D 46/70* (2022.01); *B01D 2201/0415* (2013.01); *B01D 2201/303* (2013.01); *B01D 2201/307* (2013.01); *B01D 2201/44* (2013.01); *B01D 2265/06* (2013.01); *B01D 2267/30* (2013.01); *B01D 2267/60* (2013.01)

(58) Field of Classification Search
CPC ...... B01D 2201/0484; B01D 2201/307; B01D 2267/60; B01D 2275/203
See application file for complete search history.

(56) References Cited

FOREIGN PATENT DOCUMENTS

| | | |
|---|---|---|
| DE | 3 807 828 A1 | 9/1989 |
| DE | 93 07 195 U1 | 7/1993 |
| EP | 0 555 740 A1 | 8/1993 |
| EP | 2 283 907 A1 | 2/2011 |
| EP | 2 736 619 B1 | 6/2014 |
| WO | 2012-007222 A1 | 1/2012 |
| WO | 2013/013327 A1 | 1/2013 |

OTHER PUBLICATIONS

Written Opinion for International Application No. PCT/IB2018/050518 dated Mar. 29, 2018.
International Search Report for International Application No. PCT/IB2018/050518 dated Mar. 20, 2018.

\* cited by examiner

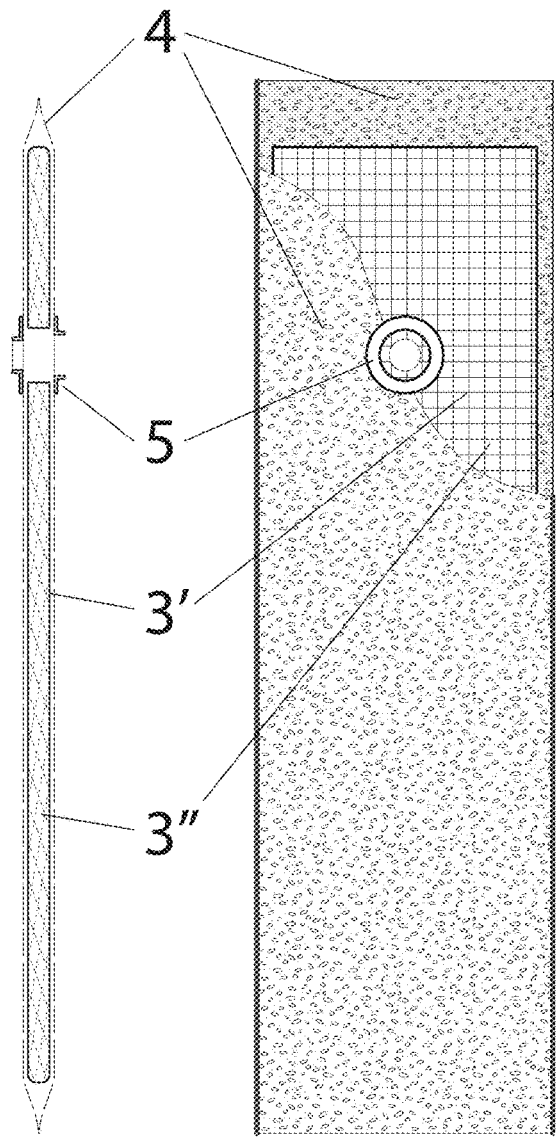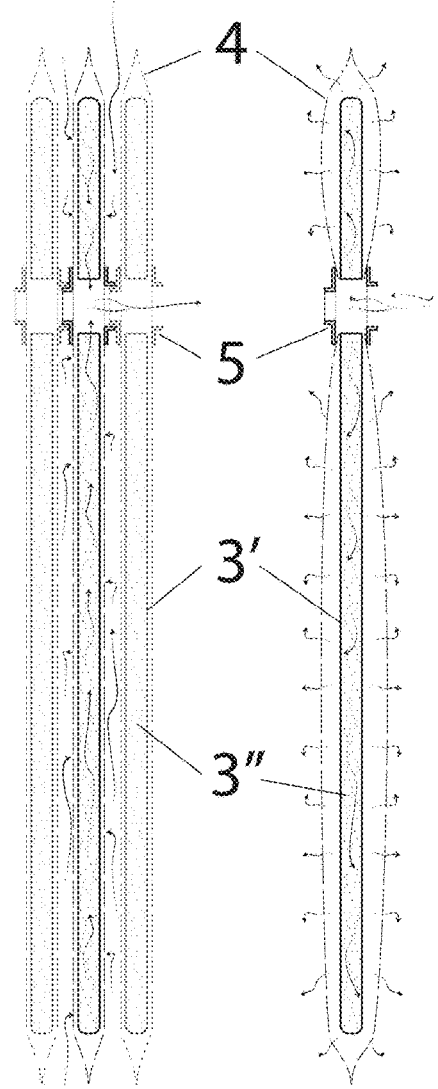
Fig. 3   Fig. 4   Fig. 5

DEVICE FOR SEPARATING SOLID PARTICLES FROM LIQUIDS AND GASES

CROSS-REFERENCE TO RELATED APPLICATIONS

This application is a National Stage application of International Patent Application No. PCT/IB2018/050518, filed on Jan. 29, 2018, which claims priority to Swiss Patent Application No. 99/17, filed on Jan. 30, 2017, each of which is hereby incorporated by reference in its entirety.

TECHNICAL FIELD OF THE INVENTION

The invention relates to a device for the separation of solid particles from liquids and gases, consisting of a pressure vessel with suspended filter elements and a disposable vessel made of flexible plastic, in which one or more flat filter elements are located, which are connected and fixed by a horizontally installed filtrate drain pipe and are suspended in the medium to be filtered (hereinafter referred to as suspension) within the disposable vessel. Numerous processes of this type are known for the separation of solid particles and liquids or gases.

BACKGROUND OF THE INVENTION

EP 2736619 describes a device for separating solid particles from liquids by means of flat filter elements arranged in one or more horizontal suspension registers, with a spacer being arranged in each case between the individual filter elements. These and similar apparatuses are usually made of metallic or non-combustible materials and are often used in pressure vessels made of stainless steel. Surfaces in contact with the product must usually be subjected to extensive cleaning and sterilization before use.

EP 0555740 shows a filter device in which the pressure vessel is laid out with a flexible plastic material and fixed to the cover flange via a sealing ring. The filter package with several filter elements can now be inserted and the container closed. The residual volume can be minimized by inflating special swelling bodies within the filter package. Since the elements of this device are only partially protected from the filter media by a flexible plastic material, parts of the filter device can only be reused with great effort. The complexity and the high number of parts and materials increase the manufacturing costs and make the installation of the equipment more difficult.

Another approach for a disposable device for separating solids from liquids is described in US 20100264100. Round, flat plastic filter elements are stacked, wrapped in a flexible plastic container and installed in a support container. The compact design results in a large filtration area. Seals between all filter elements are necessary. A so-called "scale-up" or an enlargement to scale of the filter device is expensive in view of the complex design of the filter elements and difficult to implement. Backwashing of the filter elements is also only possible with adjustments.

Due to the relatively large thickness of the individual filter elements, compression of the filter package and thus extraction of the residual volume is only partially possible.

DE 3807828 discloses a device for the filtration of liquids within a closed container having a multi-piece welded cover of thermoplastic resin and a film tube with filter cartridges disposed therein. The cover and the filter cartridges are connected by a thread. The film tube with the filter cartridges can be removed from the container for disposal.

EP 2283907A1 also describes a device for the filtration of liquids with a filter element in the form of a stable cartridge, which is sealed with a plastic film and operated in a pressure vessel. Due to the basically large shape of such filter cartridges, a relatively large pressure vessel is necessary and the available filter area in relation to the tank volume is very small. Such cartridges require a lot of material for production, which must also be disposed of after use.

SUMMARY OF THE INVENTION

It is the object of the invention to create a device that eliminates the disadvantages mentioned above and, in particular, offers a simplified filtration system as a disposable variant. This has a considerable benefit in all processes where large flow rates, minimized cleaning costs and short changeover times are required for a product change, as well as a minimized residual suspension volume. Examples are the food industry or the biopharmaceutical industry. It is particularly important in these branches of industry that a filtration system can also be offered as a sterile disposable system.

A device for the separation of solid particles from liquids and gases is disclosed, comprising a pressure vessel and a plurality of filter elements arranged in a suspended manner therein, wherein the filter elements are arranged in a flexible plastic container which is arranged inside the pressure vessel and sealed tightly against it. The flexible container can also be removed from the pressure vessel.

According to the invention, the multiple filter elements are each flat and arranged suspended parallel to each other, so that a large total filter area per volume is available, which is advantageous for the flow rate and the filter efficiency of the device. In addition, the filter elements arranged in parallel can be pressed together. For this purpose, they are connected to each other to form a filter package of a plurality of filter elements, wherein there is a predetermined free space in each case between the individual filter elements over most of their vertical longitudinal extension.

The actual filtration container consists of the container made of a flexible plastic in which the several filter elements are arranged. The filtration process takes place completely in the confined, sealed space of the flexible, inner container, wherein the liquids and gases to be treated come into contact only with the plastic of the inner, flexible container. This has significant advantages in handling aggressive media and concerning process sterility. The inner, flexible container with the filter elements can be removed as a whole from the pressure vessel without the gases or liquid coming into contact with the pressure vessel so that the device offers a disposable system. This eliminates the need for time-consuming cleaning and sterilization of the device.

The flexible, inner container with the filter elements, the actual filtration container, consists entirely of plastic, as such a viscoplastic material, is compactly foldable and storable and can be recycled after use or completely disposed of by incineration. The external pressure vessel is used to provide stability to the disposable system and to provide the necessary pressure drop for pre-, main and residual-volume filtration.

The filter package, consisting of a plurality of flat filter elements arranged in parallel, can be pressed together due to the free space between the filter elements and the viscoplastic properties of the plastic used for the inner container. The resulting flexibility of the filter package thus offers advantages when emptying the filtration container, as it can be compacted to a greater extent.

The flexibility and compactness of the flat filter elements associated with this invention also improve the residual volume discharge and reduce the raw material content.

The arrangement of the filter elements in a filter package enables a high ratio of filtration area per volume within the container. This allows a high flow rate with a small container volume and thus high filtration efficiency with low investment costs. In addition, the filter package is characterized by simple, modular manufacture, as the filter elements can be individually prefabricated to the desired lengths and combined into filter packages for specific applications.

In one embodiment of the invention, the filter elements are attached to a horizontally extending cross-connection piece and thus connected to each other to form a filter package. The cross-connection piece extends only over a small part of the vertical longitudinal extension of the filter elements so that there can be free space between the filter elements over most of their longitudinal extension.

In an alternative embodiment, the filter elements are fixed over a small part of their vertical longitudinal extension in a head element made of a castable plastic or adhesive, wherein in this case too there is free space over most of their longitudinal extension.

In one embodiment of the invention, a filter element has in each case a grid-shaped support element, hereinafter referred to as a support grid, which is covered with a filter medium that is placed over and closed all around, for example a fabric, a membrane or a felt. In addition, a filter element has channels for discharging the suspension filtered by the filter medium, also known as filtrate.

In one embodiment, the support grid is made of flexible, viscoplastic plastic, e.g. polyethylene, or a flexible, porous material, e.g. a foamed epoxy or polyurethane resin. Support grids of this type increase the compressibility of the individual filter elements themselves, so that not only the filter elements can be compressed as a package by reducing the free spaces between the individual filter elements, but also the individual filter elements themselves. This further reduces the residual volume output.

A perforated or slotted filtrate drain pipe inserted horizontally through the filter elements offers considerable advantages in the stability of the filter package and can also lead to improved discharge of the filtrate.

The filter elements are designed in such a way that a scale enlargement of the filter package, a scale-up, is very easy to achieve thanks to the modular design. It is also possible to arrange several filter packages side by side or behind each other within the same inner, flexible container.

The device according to the invention can be realized in different variants, wherein these differ mainly in the arrangement of the connections. Depending on the application, it is advantageous if the inlets and outlets of the external pressure vessel, as well as the filtrate drain, can be arranged in the upper, lateral or lower area (not shown in the figures) of the pressure vessel. The filtration container is manufactured in such a way that it can be mounted in the pressure vessel in a very user-friendly way and dismantled after use. The connection for the compressed air supply to the pressure vessel can be defined optionally at the top, side or bottom, but at least at one position. This offers advantages in the process flexibility and the efficiency of the filtration and emptying of the vessel.

In one variant of the invention, the container entrance inside the container can be equipped with a flexible plastic hose. This optimizes the filling process of the container. As an example, the container can be filled with the suspension from below through the hose with the inlet nozzle attached at the top. In addition, this has the additional advantage that the disturbance of the build-up of a solid layer is reduced by existing suspension flows.

It is advantageous that, in another variant of the invention, a press-fit tube is inserted in a side flange of the pressure vessel, which also serves as a filtrate drain. The lateral pressure of the filter elements improves the stability of the filter package and seals the connection of the filter elements if they are connected sealingly by sealing media.

In filtration processes, especially in thickenings, it is often necessary to backwash the filter elements so that the layer of solid particles built up on the filter elements can be rinsed off. The arrangement of the majority of flat filter elements according to the invention allows an improved backwashing and separation of the solid particles from the filter elements.

A well-known problem in filtration processes is the treatment of the residual volume in the filter system. The device according to the invention can reduce the residual volume by using the system in the pressure vessel by compressing the flexible filtration container with an external pressure and thus partially or completely emptying it. Especially with very expensive media this can prevent considerable additional costs. For further improved emptying, the filtration container can also be flushed with gases (e.g. sterile air).

Thanks to the completely sealed sterile filter elements, the increased filter area and the resulting high filter efficiency and complete filtration with reduced residual volume components, the filtration device according to the invention enables a cost-effective filtration device with high flow rates, minimized cleaning costs and short changeover times when changing products.

Combinations of two or more of the embodiments and variants listed above are conceivable and are hereby claimed.

BRIEF DESCRIPTION OF THE DRAWINGS

The invention is described in more detail by reference to the drawings, wherein:

FIG. 3 shows a single filter element according to the invention in longitudinal section, FIG. 4 shows a single filter element according to the invention in the lateral partial section, FIG. 5 shows a single filter element according to the invention and several filter elements of a filter package with corresponding suspension and filtrate flow directions in longitudinal section.

DESCRIPTION OF THE PREFERRED EMBODIMENTS

Figure 1:
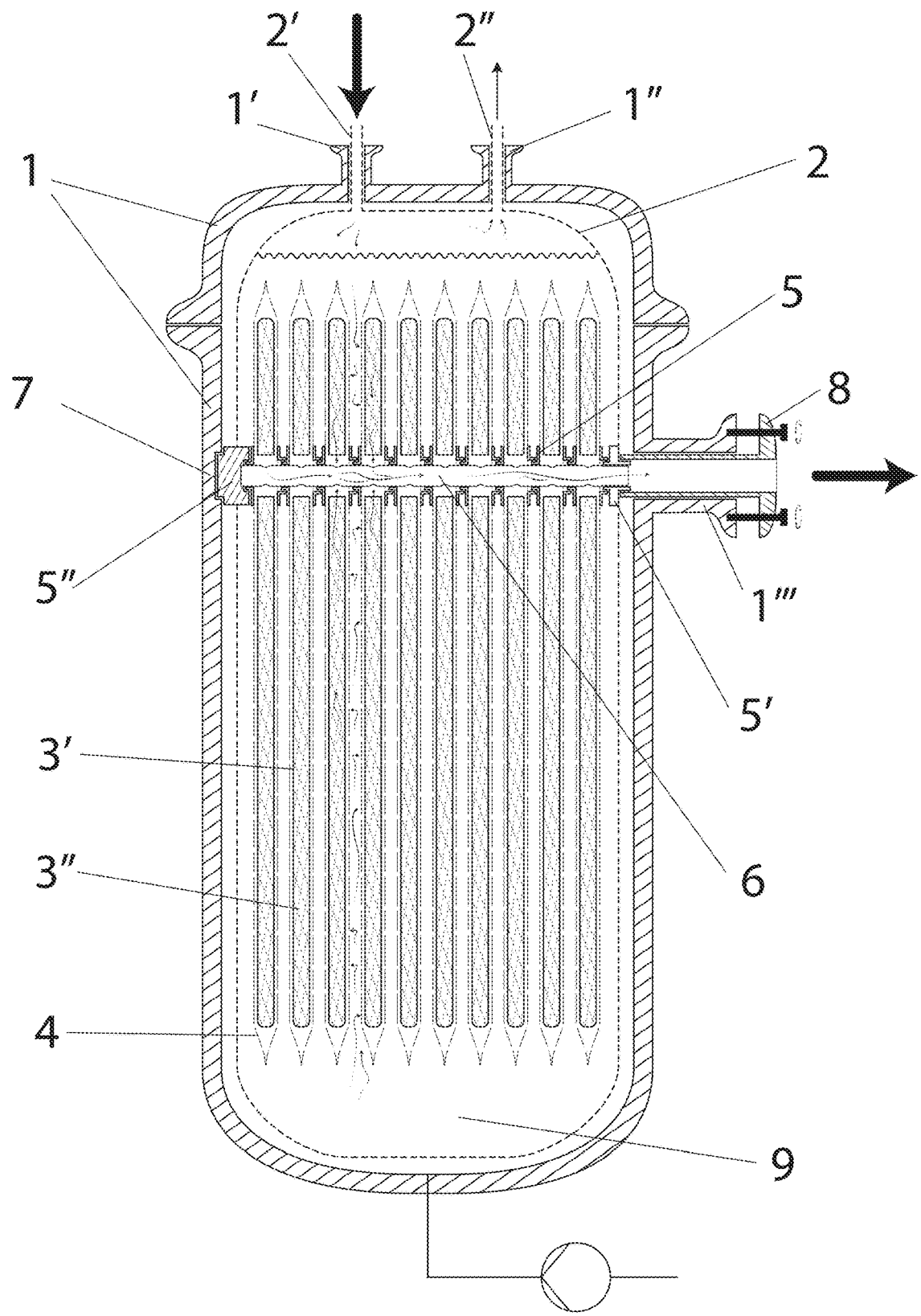
FIG. 1 shows the device according to the invention with the pressure vessel and the flexible inner filtration container in a longitudinal section during a filtration operation.

FIG. 1 shows, with the reference numeral 1, a pressure vessel whose vessel wall is equipped at the top and sides with at least one inlet, one vent and one outlet connection 1', 1", 1'" and can preferably be opened from above with the cover. (The figure does not show possible connections in the lower region of the pressure vessel.) A container 2 made of flexible plastic comprises one or more flat filter elements arranged in parallel and is installed inside the pressure vessel 1 in such a way that the connections of the container 2 (inlet 2', degassing outlet 2", press-fit tube 8 for filtrate drain) are guided and fixed suitably and sealingly through the connecting connections 1', 1", 1'". The flat filter elements generally each have a flat, elongated support grid 3' with filtrate drain channels 3", a filter medium 4 which is covered on them and closed all around, and several cross-connection pieces 5 which are connected to the support grid 3' and the filter medium 4 by sealing welding, bonding or clamping. Several filter elements are connected to form a filter package by sealing welding, bonding or clamping of the cross-connection pieces 5. Such a package with several filter elements can additionally be stabilized by a horizontally inserted, perforated plastic filtrate drain pipe 6. Container 2 encloses the filter package and is welded, glued or clamped on both sides to the respective external cross-connection pieces 5', 5" in a sealing manner. The resulting sealed filter package is positioned and fixed by pressing the cross-connection pieces 5 into a latching of the pressure vessel wall 7. This is done by inserting a press-fit tube 8, which is inserted sealingly through a filtrate drain nozzle 1'" of the pressure vessel 1, seals in the interior by a press connection to the outer cross-connection piece 5' and presses the filter package into the latching 7 of the pressure vessel 1 in such a way that the latter is stabilized. If a pressed clamping connection is selected between the cross-connection pieces 5 and between the outer cross-connection piece 5' and the inserted press-fit tube 8, an additional ring seal made of plastic or elastomers can be inserted for better sealing. The press-fit tube 8 is equipped with filtrate drain nozzle 1'" and can be guided, pressed and fixed into the container 2 by means of threads or adjusting screws. After installation, the flexible disposable filter is operated as follows: The filtration container 2 is filled with the suspension 9 through the nozzle 2', while the filtration container 2 is vented through the nozzle 2" and the pressure vessel 1. In the subsequent filtration process, which is induced by a pressure difference, the vent nozzle connection 1" is closed and the suspension 9 is filtered through the filter elements. The filtrate is discharged in the press-fit tube 8 through the filtrate drain nozzle 1'". Optionally, the filter elements can also be backwashed by reversing the pressure drop. This can be useful in that a built-up layer of solid particles dissolves again to increase filtration throughput.

Figure 2:
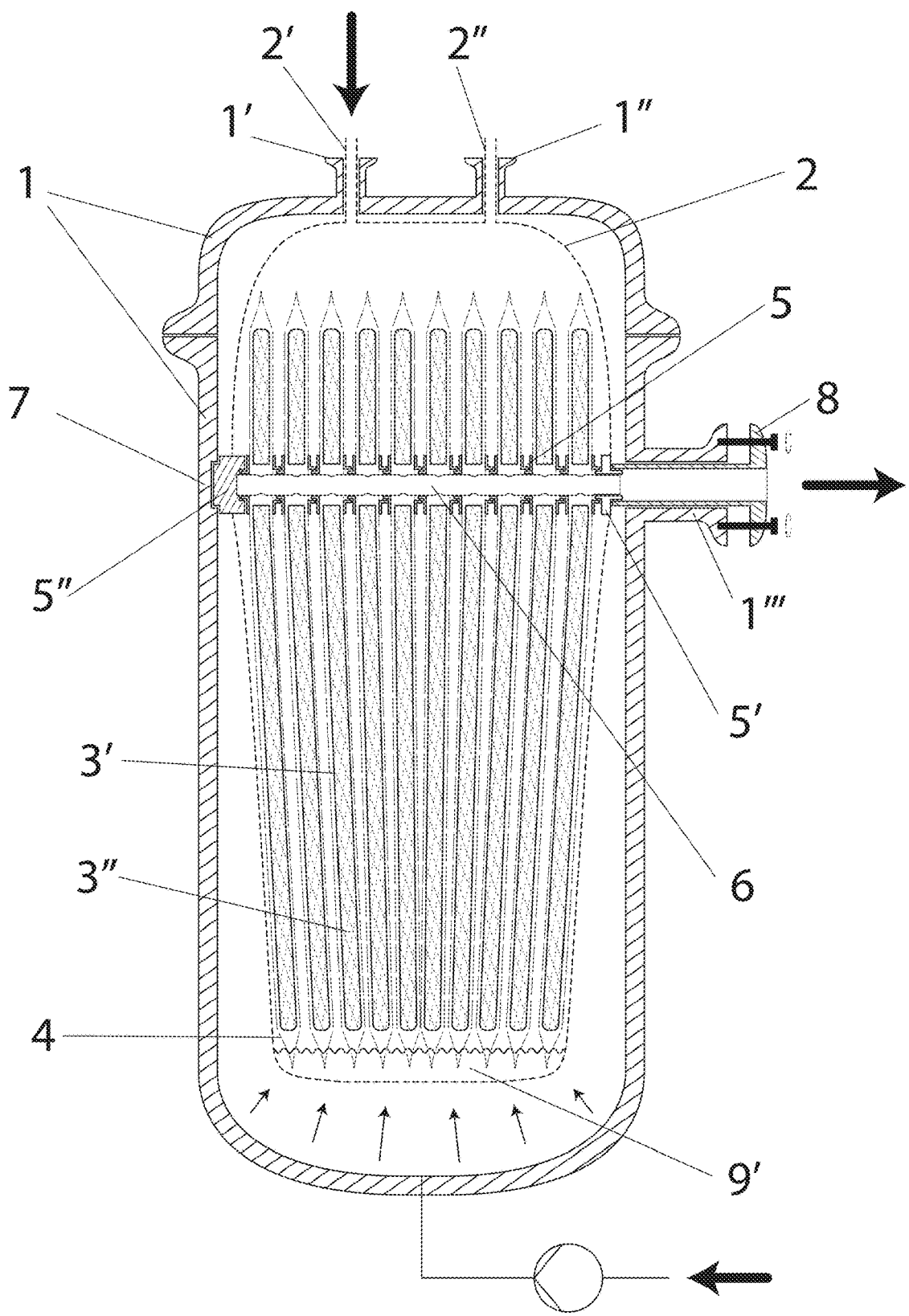
FIG. 2 shows the device according to the invention with the pressure vessel and the flexible inner filtration container in a longitudinal section during the emptying of the filtration container.

FIG. 2 shows a subsequent residual volume filtration. In order to reduce the residual volume of the suspension 9', the inlet connection 2' is closed and the pressure in the pressure vessel 1 is increased, resulting in compression of the flexible vessel 2 and partial or complete emptying. By using a viscoelastic plastic material for the flat support grid 3', the filter package can compress and compact itself during residual volume filtration to facilitate emptying. To further assist emptying, air or other gases can flow through the container inlet 2', wherein the last liquid components of the suspension and the filtrate in container 2 and the filtrate drain channels 3" can be flushed through the filtrate drain pipe 6. In another variant of residual volume filtration with the disposable device, the residual volume 9' can be discharged in the opposite direction through a container inlet 2' or the vent outlet 2" after successful filtration. Also in this variant the flexible container 2 is compressed and compacted by applying a pressure in the pressure vessel 1.

FIGS. 3 and 4 show the frontal and lateral longitudinal section of a filter element. This consists of a support grid 3' made of a viscoelastic plastic material, covered with the filter medium 4 which is closed all around. The support grid 3' can be made of a flexible plastic or porous material and shows filter drain channels inside. Also visible are the welded, glued or pressed-on cross-connections 5 made of plastic and sealed by means of a sealing ring (e.g. pressed by a pressing surface with flat seal pressed on by a thread).

FIG. 5 shows a filter package consisting of several filter elements in longitudinal section. These are connected between the cross-connection pieces 5 by a sealing welding, gluing or clamping, wherein an additional ring seal can be added to the latter for additional sealing. FIG. 5 also shows the expected flow directions of suspension 9 and filtrate during filtration (left) and backwashing (right). An additional transversely introduced, perforated or slotted filtrate drain pipe can increase the stability of the filter elements in the filter package. In another variant, it is also possible to use cross-connection pieces 5, which are guided through the filter elements in a supporting manner. After welding, gluing or clamping of the cross-connection pieces 5, they form a filtration drain pipe and thus stabilize the filter package without the addition of a separate filtration drain pipe.

Figure 6:
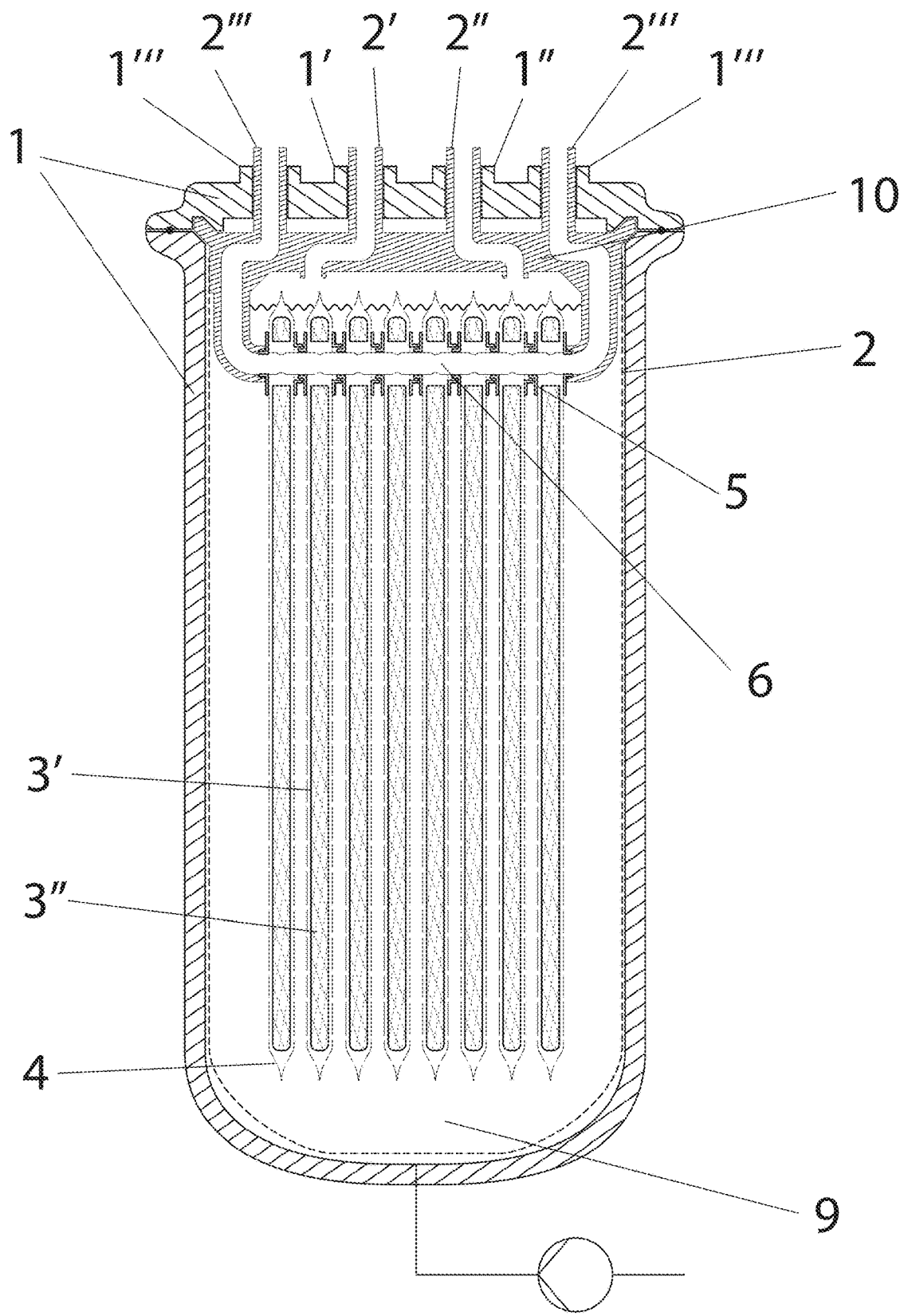
FIG. 6 shows a variant of the device according to the invention with lateral fastening of the filter package inside the inner, flexible container.
Figure 7:
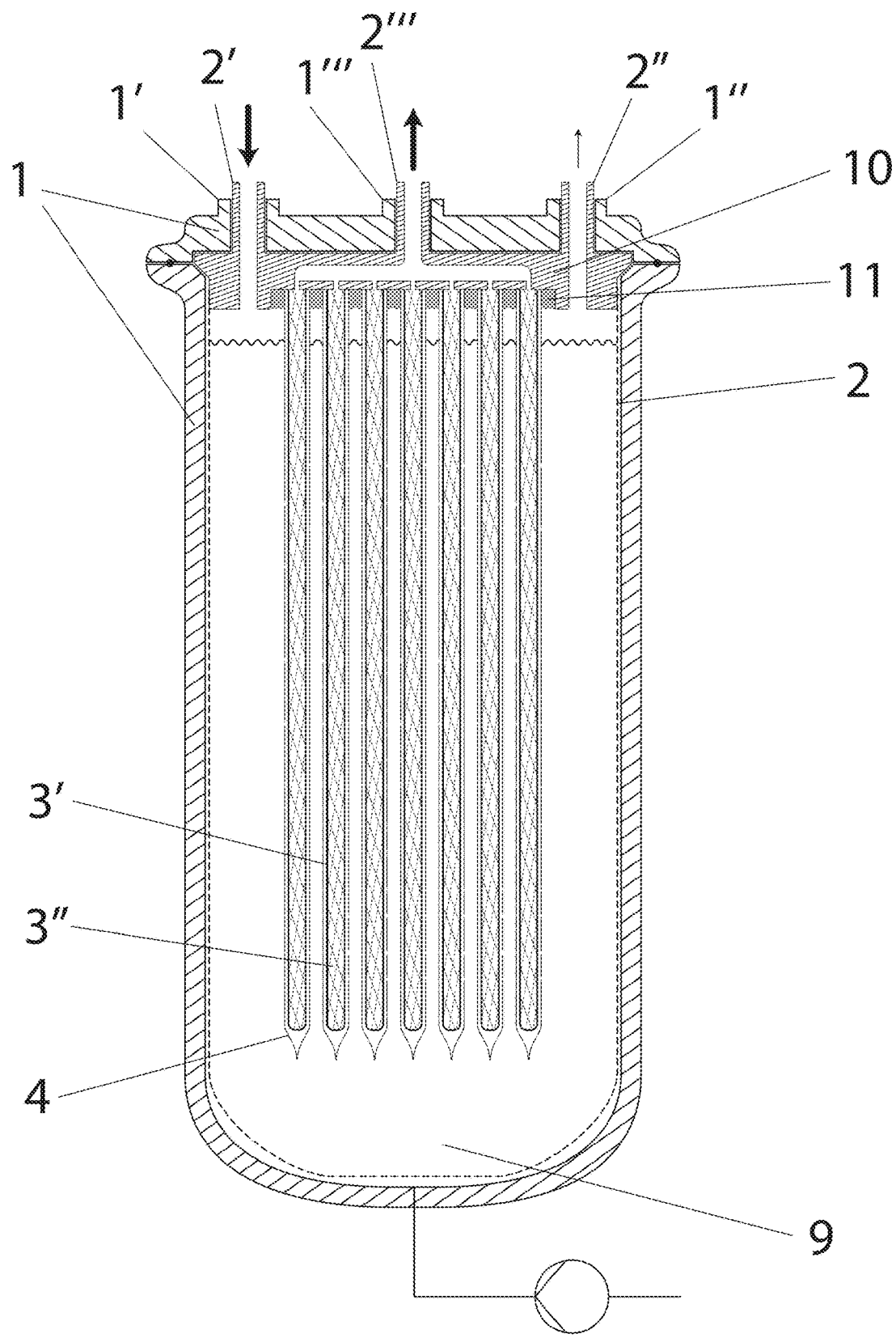
FIG. 7 shows a variant of the device according to the invention with head-side fastening of the filter elements in the filter package head inside the inner, flexible container.
Figure 8:
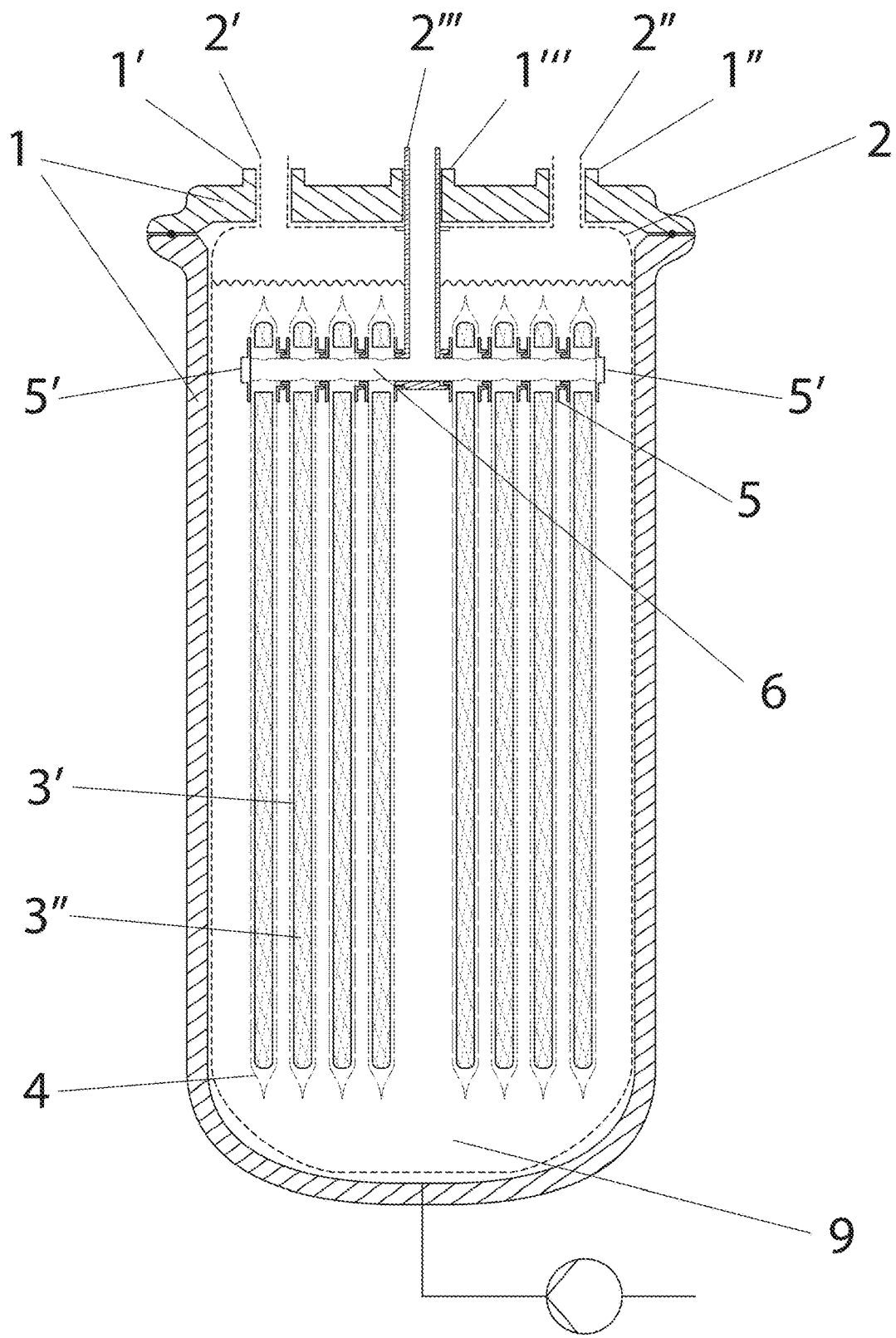
FIG. 8 shows a variant of the device with central fastening of the filter package within the inner, flexible container.

FIGS. 6, 7 and 8 show further variants of the filtration container 2 which can be used as a disposable container without inserted press-fit tube 8. To facilitate the installation of container 2 in pressure vessel 1, the inlets and outlets for the suspension, process gases 2', 2" and filtrate 2'" are attached to one side of the cover (the variant with the connections from above is shown). The positions of these inlets and outlets can be realized at the top, side or bottom of container 2. The inlet and outlet nozzles 1', 1", 1'" must also be repositioned accordingly on pressure vessel 1. In addition, it is possible (not shown) to provide the container inlet 2' inside container 2 with one or more hoses, which preferably distributes the supplied suspension 9 in container 2. For example, a container inlet 2' can be equipped with a hose that leads the suspension 9 to the lower part of container 2. Thus the suspension 9 can be introduced into container 2 from below, even if the container inlets 2' are in a different position (here: above). This variant has the advantage that the filter cake that is building up is not rinsed off again by an introduced suspension 9, which improves filtration in certain applications.

FIG. 6 shows a filtration container 2 in which the filter package is laterally connected to a solid plastic filter package head 10. The connection can be realized by sealing welding, gluing or clamping. The filter package head 10 already contains all the inlets and outlets required for filtration (container input 2', vent output 2", filtrate drain 2'") and is sealingly connected to the flexible container wall of container 2 by welding, bonding or clamping and encloses the entire filter package. The advantage is that with this variant no inserted press-fit tube 8 is necessary and therefore all inputs and outputs of container 2 as well as its filtrate drain 2'" can be positioned on one side. This simplifies the installation of container 2 in pressure vessel 1 and improves the stability of the filter package.

FIG. 7 shows a modification of the variant of the filtration container 2 shown in FIG. 6, in which the individual filter elements are not connected to form a filter package by means of cross-connection pieces 5, but are connected in a head element 10 for the filter package by means of a casting material 11, for example a hot-melt adhesive, a liquid adhesive system or a heated, liquid plastic. This arrangement in turn forms a filter package with a predetermined clearance between the filter elements, which allows the filter package to be compressed and compacted during residual volume filtration.

A further development of the invention can be seen in FIG. 8. The filtrate drain 2''' is realized by a filtrate drain pipe which is located centrally in the filter package and is sealingly welded, glued or clamped to it. The filtrate drain pipe 2''' is sealingly connected to the container wall on one side of the container 2 (preferably above or below) and guided through an appropriately positioned filtrate drain connection 1''' on the pressure vessel 1. The filter package is connected to the central filtrate drain pipe 2''' and is supported by it. The flexible container wall encloses the entire filter package and can also be attached to the outer lateral cross-connection pieces 5'. For additional stability, a slotted or perforated filtrate drain pipe 6 can also be passed through the filter elements here. It is also possible to attach latchings (not shown) in the pressure vessel wall 7, on which the outer cross-connection pieces 5' can be supported and/or clamped.

While the present invention has been illustrated and described with respect to a particular embodiment thereof, it should be appreciated by those of ordinary skill in the art that various modifications to this invention may be made without departing from the spirit and scope of the present.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A device for separating solid particles from liquids and gases, comprising a pressure vessel with a plurality of suspended filter elements, wherein the filter elements are arranged in a flexible plastic container which is arranged in the pressure vessel and sealed tightly with respect thereto and compressible upon application of a pressure into the pressure vessel external to the flexible container, and the flexible container is removable from the pressure vessel, wherein the filter elements are each of flat design, including a flat support grid and a filter medium which is placed over and encloses the support grid, and further comprise channels formed therein for discharging a suspension filtered by the filter medium of each filter element, and wherein further the filter elements are arranged in suspended manner in vertical longitudinal extension and parallel next to one another and are connected to one another to form a filter package, wherein said connection between filter elements being towards a first longitudinal end of the filter elements such that a first longitudinal portion of the filter element vertically suspended below a point of connection is greater than a second longitudinal portion of the filter element extending above said point of connection, wherein, when there is no pressure applied in the pressure vessel, there is a free space between the filter elements over a majority of their vertical longitudinal extension and the filter elements are compressible relative to one another upon compression of the flexible container by an increase of pressure in the pressure vessel.

2. The device according to claim 1, wherein the filter elements are fastened to a horizontally extending cross-connection piece.

3. The device according to claim 1, wherein at least one filter element is fixed in a head element by means of a castable plastic or adhesive.

4. The device according to claim 1, wherein the support grids are made of a flexible plastic or porous, flexible material.

5. The device according to claim 2, wherein the filter elements in the filter package are additionally stabilized and fixed by a horizontal, perforated or slotted filtrate drain pipe.

6. The device according to claim 1, wherein one or more rows of filter packages are arranged inside the container.

7. The device according to claim 1, wherein nozzles of the flexible container are arranged in the upper region of the flexible container or laterally or below a lateral region of the flexible container.

8. The device according to claim 1, wherein a press-fit tube is arranged in a side flange on the pressure vessel.

9. The device according to claim 1, wherein the filter elements in the filter package are additionally stabilized and fixed by a horizontal, perforated or slotted filtrate drain pipe.

10. The device according to claim 1, wherein the channels have a direction that is generally parallel to the longitudinal extension of the filter elements.

\* \* \* \* \*